US005204756A

United States Patent [19]

Chevion et al.

[11] Patent Number: 5,204,756

[45] Date of Patent: Apr. 20, 1993

[54] METHOD FOR HIGH-QUALITY COMPRESSION OF BINARY TEXT IMAGES

[75] Inventors: Dan S. Chevion, Haifa; Ehud D. Karnin; Eugeniusz Walach, both of Kiryat Motzkin, all of Israel

[73] Assignee: International Business Machines Corporation, Armonk, N.Y.

[21] Appl. No.: 559,734

[22] Filed: Jul. 30, 1990

[30] Foreign Application Priority Data

Aug. 4, 1989 [IL] Israel ........................................ 91221

[51] Int. Cl.[5] ........................................ H04N 1/40

[52] U.S. Cl. .................................... 358/426; 358/462; 358/467

[58] Field of Search ............ 358/429, 430, 426, 261.1, 358/261.2, 261.3, 261.4, 427, 267.1, 432, 433, 462, 464, 463, 467

[56] References Cited

U.S. PATENT DOCUMENTS

| | | | |
|---|---|---|---|
| 3,700,797 | 10/1972 | Wernikoff | 178/6 |
| 4,229,768 | 10/1980 | Kurahayashi et al. | 358/261.3 |
| 4,290,084 | 9/1981 | Minshull et al. | 358/260 |
| 4,542,411 | 9/1985 | Imanaka et al. | 358/261.3 |

FOREIGN PATENT DOCUMENTS

| | | | |
|---|---|---|---|
| 0194689 | 3/1985 | European Pat. Off. . | |
| 0018617 | 2/1979 | Japan | 358/433 |

OTHER PUBLICATIONS

IBM Technical Disclosure Bulletin; vol. 20, No. 12 May 1978; "Optical Scanning of Continuous-Tone and Line Documents With Spectial Frequency Separation for Improved Data Handling and Compactor"; pp. 5416-5421.

IBM Tech. Disc. Bull.; vol. 24, No. 9 Feb. 1982; "High Performance Exact Gray-Scale Compression Technique"; pp. 4513-4516.

8th Int. Conf. on Pattern Recog. Proceedings IEEE New York, N.Y., vol. 1, Oct. '86 Paris, France pp. 916-918.

*Primary Examiner*—Stephen Brinich
*Assistant Examiner*—II Grant
*Attorney, Agent, or Firm*—Joscelyn G. Cockburn

[57] ABSTRACT

The invention relates to a method for the compression and decompression of binary test images. The method distinguishes between large low-frequency areas and small high-frequency areas in the original frame. For the low-frequency areas, a scheme for lossy compression is used, whereas for the high-frequency areas, a scheme permitting lossless compression is applied. The compression/decompression process involves five stages; namely prefiltering to remove all black patches (e.g. by removing all black pixels, except where they belong to a large black segment), fast evaluation of compressibility by partitioning the images into mutually exclusive segments and applying different compression modes to each segment, connectivity-oriented subsampling to reduce the reslolution in horizontal and vertical directions which cause the image to be segmented into blocks and a 1-pixel representation for each block is determined, lossless compression and decompression where the reduced file is compressed by conventional techniques, and reconstruction by sequence reversal so that lossless decompression will retrieve the subsampled file, expansion of the subsampled file through replacement of each pixel by a block having equal value and postfiltering.

12 Claims, 5 Drawing Sheets

METHOD FOR HIGH-QUALITY COMPRESSION OF BINARY TEXT IMAGES

This invention relates to a method for compressing binary image information, in particular in cases where the image comprises text, i.e. only black or white areas. This invention is, therefore, applicable in the electronic processing of information presented on printed or handwritten documents, where the storage of the information while the various processing steps are being performed, the storage for future reference or retrieval and the treansmission over data links present space and/or time problems.

The handling of paper documents is a daily routine in today's office environments. Considerations having to do with the care for the natural resources required for manufacturing the paper used for the documents, the speed of preparing and handling the documents to make them serve their purpose, and their storage and possible later retrieval, have resulted in efforts to reduce the number of documents circulated and to leave the working with the documents to automatic record handling devices. The physical handling of the documents is one important aspect in this connection, the other, possibly more important aspect is the treatment of the information contained in the documents.

The treatment of the information contained in documents generally involves the acquisition of the information by some reading device, the transformation of the acquired information into a machine-readable code, the storing of the coded information for later, and possibly repeated processing, the actual processing of the information, and finally the output of the results of the processing, or simply of the unprocessed original information. This output may take visual form, as on a display unit, or in print, or be purely electronic.

The acquisition of the information by a reading device, such as an optical scanner, should be performed with a reasonably high resolution lest the information content should become mutilated or partially lost. Accordingly, the reading device will produce a high volume of scan data which in turn require a large memory capacity for storage. As a typical example, a page of the A4 size (297×210 mm), scanned at 100 pels/cm (where "pel" stands for picture element and is either a white or black dot), requires about 700 kBytes of storage space. Even a rather modest number of documents, say a couple of thousands, would call for an unreasonably big memory.

To alleviate this problem, known document scanning systems are provided with data compression routines which save about one order of magnitude so that the compressed data of a scanned A4 page can be accommodated on 25 to 75 kBytes of storage space, depending, of course, on the content of the scanned page. Very clever algorithms, based on arithmetic coding, can achieve a further reduction of about 16%. See, for example, R. Arps, T. Friedman, G. Langdon and T. Truong, "Adaptive Binary Image Compression: Chip Status and Applications", Image ITL, May 1986.

It goes without saying that any compression system must permit later decompression of the information, be it for processing or output. Whether the compressing or decompressing can be done with a certain loss of information, or degradation of quality, depends on the purpose for which the output is needed, and on the amount of redundancy contained in the original image.

In a number of applications where very large volumes of documents must be handled, such as, e.g., in connection with a census, it is essential to increase the compression ratio to its limits, at least by another order of magnitude.

One possible approach to this problem is described in "Combined Symbol Matching Facsimile Data Compression System" by W. K. Pratt, P. J. Capitant, W. Chen, E. R. Hamilton and R. H. Wallis, in Proc. IEEE, Vol. 68, No. 7, July 1980:

There it was proposed to feed binary images into a character matching process. Recognized characters will be represented very efficiently by means of their alphanumeric form. Then the remaining residue information will be compressed separately as a conventional binary image. This amounts to an about two-fold increase in compression ratio, although the efficiency of this scheme largely depends on the percentage of recognized characters and on the degree of digitization noise.

An improved technique is disclosed in U.S. Pat. No. 4,499,499 Brickman et al., where instead of single character recognition the matching of large symbols, such as individual words in the text, is considered. This technique requires, however, the storing of an addressable library of facsimile symbols, or words, and it does not work for words not found in that library.

It is an object of the present invention to propose a method for the compression of image data with a compression ratio considerably larger than offered by conventional compression methods. The inventive method is based on the cognition that this cannot be achieved if one was to insist on lossless compression, i.e. compression that would permit an exact reconstruction of the original information. Actually, in the majority of practical applications involving text images, lossless compression is not essential. It suffices to have a legible text which subjectively is indistinguishable from the original.

A trivial approach to this would be to reduce the resolution of the scanner. Indeed, many conventional scanners and facsimile devices do allow this option. However, while this approach might be acceptable for some types of image, such as large handwritten text, it would mean unacceptable distortion for other types, like those containing small print. Even for medium-sized text, simple reduction of resolution would cause image quality deterioration which might be annoying to the user.

In contrast, the present invention pretends to solve this problem through a method featuring an overall high compression ratio by means of "lossy" encoding where this is tolerable, and by means of "lossless" encoding where this is essential in maintaining the reproduction quality. This proposal, accordingly, involves the use of variable compression ratios which depend on an evaluation of the nature of the binary image at hand, with lossy compression being limited to large low-frequency areas (where quality deterioration is subjectively unnoticeable, and with small high-frequency areas being compressed losslessly.

The method of the invention still even goes one step further. Even in areas where lossy compression is found feasible, it will not be applied indiscriminately. Instead, the compression ratio to be used will in each particular case be adapted to the preservation of the continuity and smoothness of the lines in order to guarantee an overall excellent image quality.

Details of the invention will now be described by way of example with reference to the drawing in which.

The method in accordance with the invention essentially comprises the following five discrete steps: Prefiltering, Evaluation of Compressibility, Connectivity-oriented Subsampling, Lossless Compression and Decompression, and Reconstruction. Each of these steps will hereinafter be reviewed in detail.

1. Prefiltering

Prior to the actual evaluation for compressibility, the scanning data must be "cleaned" by removing all small superfluous black patches which might result either from the scanning noise or from a non-uniformity of the document background. There is a wide variety of filters available which may be used. Reference is made to T. Kimoto and R. G. Casey, "Edge Smoothing Algorithms for Horizontal and Vertical Line Patterns in Binary Images", IBM Research Report RJ 4156, November 1984, and F. M. Wahl, "A Binary Image Processor for Document Quality Improvement and Data Reduction" IBM Research Report RZ 1438, December 1985.

The optimum choice of the filter depends on the character of the specific application and on the availability of the computational power. One preferred filter which is both, fast and effective for a great variety of practical applications, operates on the principle of removing from the binary image all of the black pixels ("pixel" stands for 'picture element'), except for those which either belong to a large black segment or which are adjacent to such segment. A large segment in this context is defined as a run of three black pixels in a row, either horizontal or vertical. If the following information pattern (Array 1)

```
............................................
...11111111111111......................1....
.....1........111........11......1.....1....
..............111..........1.....1.....1....
............1.1111.....................1....
............................................
```

is passed through such a filter, the result will be as follows (Array 2):

```
............................................
...11111111111111......................1....
..............111......................1....
..............111......................1....
..............1111.....................1....
............................................
```

Clearly, as a result of the filtering step, small features, which human vision tends to interpret as noise, will disappear. At the same time, written characters, even if they are only one pixel wide, will remain unaltered.

Figure 1:
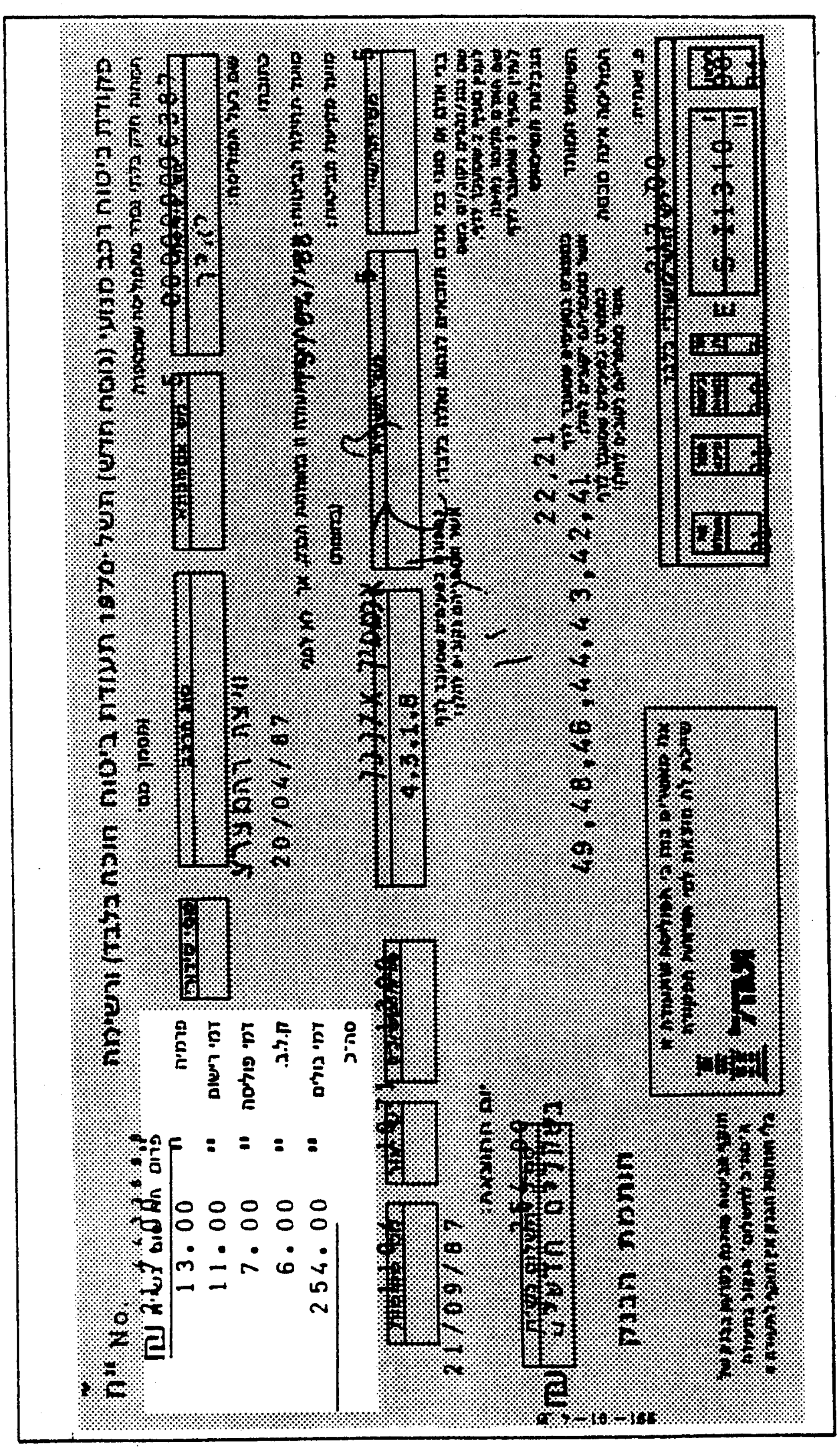
FIG. 1 is an original, completed form with a colored background.
Figure 2:
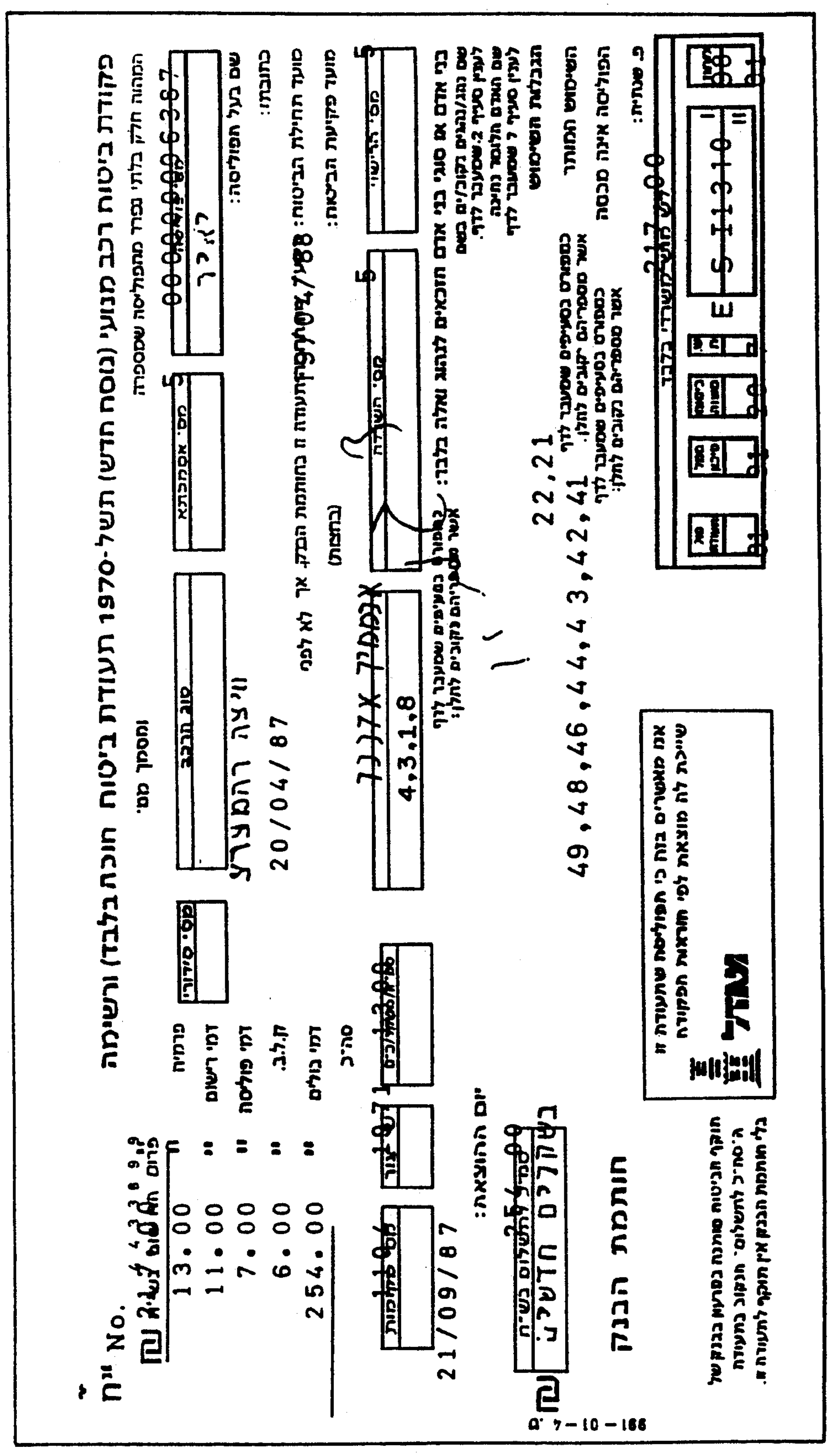
FIG. 2 is the form of FIG. 1 after filtering.

As an example for the efficiency of this approach, reference is made to FIGS. 1 and 2. FIG. 1 is a copy of an original form having a colored background created by a diffused grid of colored dots. After scanning, the data are overloaded with a great deal of noise stemming from the colored background. This noise is, of course, subjectively annoying, but it also consumes a lot of valuable storage space, and in addition prevents efficient compression. Having passed the scanning data through a filter of the characteristics mentioned above, the background noise has disappeared from the data, as shown by FIG. 2 which is a reconstruction generated from the filtered data.

While the filter described above was assumed to be designed for the removal only of small black patches on a white background, a similar filter can be constructed for the removal of small white patches on a black background, such as white noise on a normally black line element. Preferably, both types of filter might be chained up to be able to deal with black and white noise areas.

2. Evaluation of the Degree of Compressibility

Of course, in order to save processing time and storage space, one would prefer to apply lossy compression to the entirety of the data representing a scanned binary text image. However, any binary image comprises areas with a high information density and other areas where the information content is low. Lossy compression, therefore, when applied to high-density information, will inevitably lead to a degradation of the intelligibility of such information. The method of the invention, therefore, pretends to apply the lossy compression only to those parts of the information where the intelligibility is not in danger of being noticeably degraded. Thus, lossy compression should be applied only in the low-frequency areas where characters are drawn by relatively wide lines, and with large distances between words.

To do this, the image will be partitioned into mutually exclusive segments, and an individual compression ratio will be assigned to each of the segments. The partitioning may be made in an arbitrary manner governed, of course, by the desire to have the smallest segments for which a statistical compression scheme is still meaningful.

This task is similar to the differentiation between image and text segments of a data array, for which a proposal was made by K. Y. Wong, R. G. Casey and F. M. Wahl, "Document Analysis System", IBM Journal of Research & Development, Vol. 11, November 1982, pp. 647–656. However, the specific nature of the problem tackled with the present invention requires a solution quite different from the one proposed in this reference.

It will be clear to those skilled in the art that the feasibility of performing lossy compression depends on the widths of white and black intervals in the original text image. It is, therefore, necessary to have a quantitative measure of the relative width of these intervals, with an absolute width value governing the threshold beyond which the discrimination commences. Two alternative approaches may be considered:

a. The Pixel-Based Approach

The idea is to scan the image line by line and to determine, for each block, the average length for all, black and white intervals. For the sake of simplicity, in the following discussion it will be assumed that always two consecutive lines constitute one block. Naturally, the existance of large black or white areas, such as wide page margins, should have no impact on the determination of the compressibility.

Figure 3:
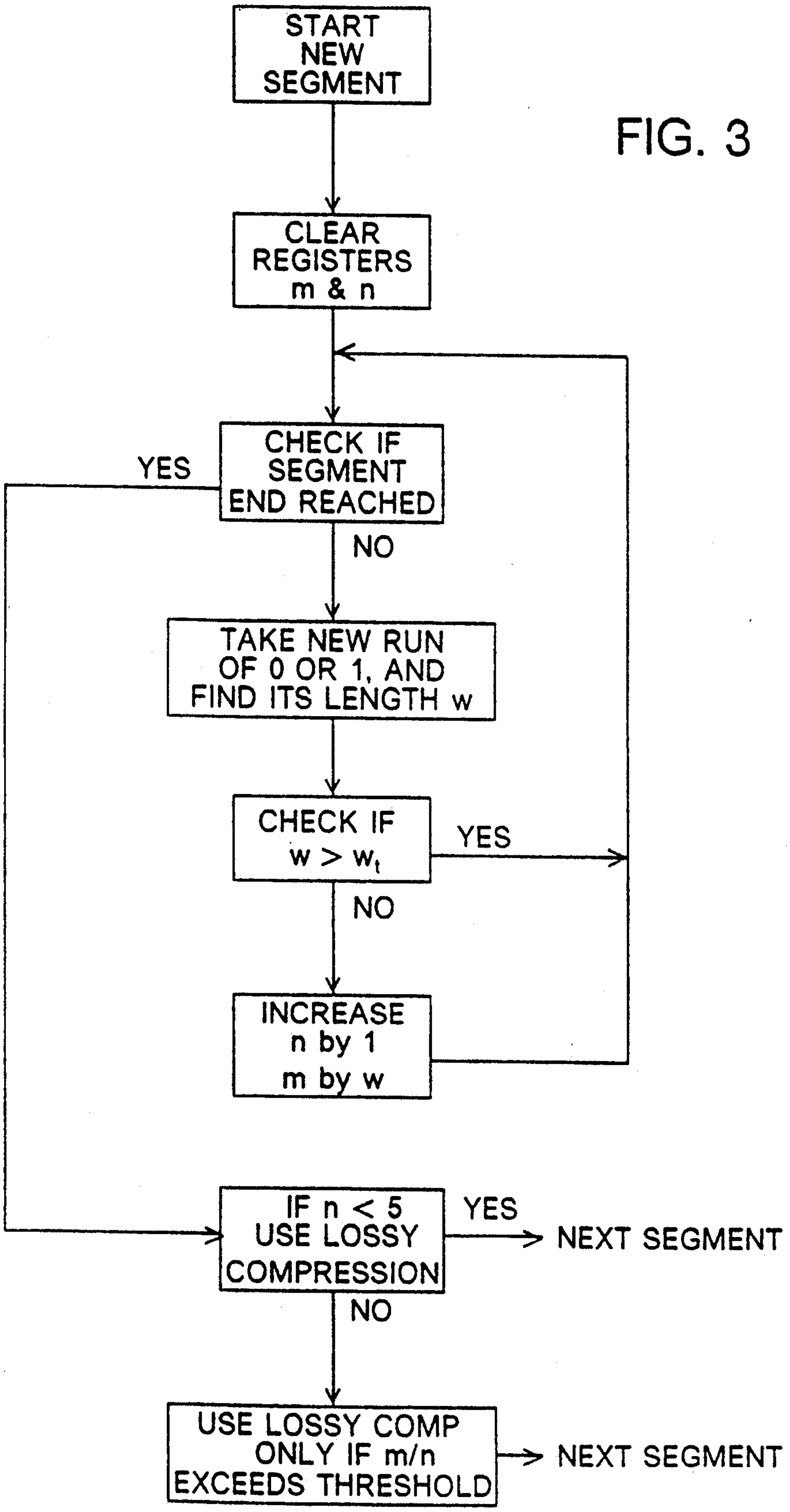
FIG. 3 is a flow chart showing the determination of the compressibility.

The partitioning procedure will now be explained with reference to the flowchart of FIG. 3. In its first step, the procedure ensures that the registers designated as m and n are cleared. These registers may, for example, simply be two places in the main memory that accommodate two integer numbers. It is then determined whether the end of the segment under evaluation has already been reached. If so, a branch is made to a check of the value for n. If it exceeds a predetermined threshold $n_t$, say 5, then a new segment will be addressed. If it does not exceed that threshold, a new run of black (1) or white (0) is taken into consideration to determine its uninterrupted length w.

A check is then made as to whether the length w exceeds the threshold $w_t$. In one embodiment of the invention, a threshold value of $w_t = 12$ was found to be appropriate. If that threshold is exceeded, new run is addressed. If not, the value of n is incremented by 1, the value of m is increased by w. This process continues until the end of the segment is encountered. If n is still smaller than the threshold $n_t$, lossy compression is performed on that segment. If n is larger than $n_t$, lossy compression is performed only if $$\frac{m}{n} > \left(\frac{m}{n}\right)_t,$$

which may be set to 4, for example.

It is to be noted that the choice of the design parameters, such as the threshold values referred to above, is a matter of experimentation. The values given herein were determined empirically, but they are not meant to be limiting in any way. The values may be varied as necessary in order to increase or decrease the share of the compressed areas, and to, thus, choose the trade off between image quality and desired degree of compression.

b. The Byte-Based Approach

While the pixel-based approach outlined under 1) above performs quite well, it might under certain circumstances turn out to be computationally cumbersome. This can be improved by packing, or re-packing, the pixels into a larger "containment". Indeed, in the majority of practical applications, image data are packed in the byte mode, where one byte represents eight consecutive pixels. Hence, considerable time will be required for the translation of the data to the "normal" raster mode in order to compute the length of all the black and white intervals. In this context, "normal" means that a single number is assigned to each pixel. Thus, if one has to perform arithmetic operations on pixel values, one has to first translate each byte into the corresponding 8-pixel values. This could, e.g. be done by using a look-up table with 256 entries, one for each possible byte value, and eight output ports, one for each pixel.

The preferred procedure comprises the following four steps:

1) The number m of non-zero bytes is first computed.

2) Each byte is translated into a binary number. This binary number equals 1 if the given byte contains a small black or white run, and it equals 0 in all other cases. A byte is determined to actually contain such a small black or white run if it does not equal either 00000000 or 11111111, when, at the same time, the first pixel of the byte equals the last one.

3) The number n of pairs of consecutive "1"-s is computed.

4) Lossy compression is initiated if n is smaller than a certain predetermined threshold (which may be 3, for example), or if n is smaller than a given fraction of m (say less than 5%). The mentioned threshold and fraction depend on the specific application and should be determined experimentally.

While the horizontal and vertical distances are generally of the same order of magnitude, it might be advantageous in certain cases to apply the test mentioned before to the transposed version of the original image: Then vertical distances will be considered. Moreover, it might be useful to develop the compressibility criterion from a combination of the regular and transposed versions of the original image, although the experiments carried out suggest that in most practical cases the consideration of the horizontal distances, as described above, is sufficient.

It should be further noted that it might be useful to apply the test to two consecutive lines simultaneously, where the length of the short run would be defined as the larger of two consecutive intervals. As a result, the impact of one-pixel wide noise will be mitigated. This refers in particular to cases where a pixel is located at a line edge. Then either a 1 or 0 value can be obtained. Hence, at the edges of straight lines one can see a one-pixel layer of scanning noise. This is, of course, not the only possible noise effect, but it very important from the point of view of the compressibility test.

Consider, for example, the following long horizontal line (Array 3):

```
00000000000000000000000000000000000
00000000000000000000000000000000000
00110000011111000001111000001010101
11111111111111111111111111111111111
11111111111111111111111111111111111
01000011000101010101000011111111100
01000011000101010101000011111111100
```

Obviously, it can be subjected to a lossy compression without any discernible image quality degradation, however, on the edge (third and sixth lines from the top) a lot of short black and white sequences might cause the decision that this area is incompressible.

3. Connectivity-Oriented Subsampling

In the connectivity-oriented subsampling of the original image, the aim is to reduce the resolution by some factor in both horizontal and vertical directions. Assuming the factor is chosen to be 2, the image will have to be partitioned into 2×2 blocks, and a one-pixel representation for each block will have to be found.

Blocks having less than two black pixels will be regarded as white. Their average representative value will be 0. Blocks having more than two black pixels will be considered as black, and their average representative value will be 1. The question is what would be the most appropriate decision for blocks having exactly two black pixels? One obvious approach would be to use some arbitrary decision mode. For example, "problematic" blocks will be assigned either always 0 or always 1. Unfortunately, if such an approach were to be adopted, it would either cause the disappearance of all narrow (one pixel wide) lines or would merge some originally disjoint lines. In any case, the deterioration in image quality would be unacceptable.

A preferred approach is based on the consideration of the vicinity of each "problematic" block. Under this scheme, a value 0 is assigned to each block having two black pixels, except for those cases where such an assignment would break a connection between two lines. In this last case, the assignment would be switched to 1. One possible embodiment of such an assignment scheme would be the following iterative procedure (still assuming that the factor of reduction is 2):

a. The original binary image array O is partitioned into mutually exclusive 2×2 blocks.

b. The final array $O_r$ (i.e. the one with reduced resolution) is created by setting to 1 all pixels which correspond to the blocks of O and where the number of black pixels exceeds 2.

c. Traverse the original array O on a block-by-block basis, for each block having exactly two black pixels. Denote by A through H all neighboring pixels (in array $O_r$) as depicted below, with the pixel under consideration being designated "X" (Array 4):

| | | |
|---|---|---|
| A | B | C |
| D | X | E |
| F | G | H |

d. If B=D=E=G=1, then X constitutes a narrow opening on the black background. Accordingly, X is set to O, and the consideration is shifted to the next pixel of O (or to the corresponding Block of O).

e. If all of the pixels A through H in the vicinity of X are white (0), then we are dealing with a narrow black line. X is then set to 1, and the next pixel is taken into consideration.

f. If D=E=0, and in O there is a connection from B to G, then X is set to 1, and the next test below is performed.

The existence of the connection between B and G will be established by taking, from O, a 6×6 array T which consists of the pixels belonging to the block under consideration and its eight nearest neighbors, i.e. all the pixels belonging to the blocks in the scheme above. Per definition, the connection exists if each line of T has at least one black pixel.

g. If B=G=0, and in O there is a connection between D and E, then X is set to 1, and the scheme proceeds to the next test below.

The existence of the connection between D and E will be established by considering the array T which was defined in the previous stage. The connection exists if each column of T has at least one black pixel.

h. At this stage of the process there remain only three possibilities: Between the pixels B, D, E, G there are one, two or three black pixels. For each of these cases, the decision logic will be as follows:

1) Between B, D, E, and G there is exactly one black pixel.

This case is applicable mainly to the pixels located on the edges of of relatively thick lines. Accordingly, an arbitrary decision mode may be adopted. However, in order to preserve the line width, X was chosen as X=1 for lines coming from the top and left directions, and X=0 for lines coming from the right and from the bottom. Accordingly, a) If B=1, and D=E=G=0, then set X to 1 b) If D=1, and B=E=0, then set X to 1.

c) Else, set X to 0 and proceed to the next pixel.

2) Between B, D, E and G there are exactly two black pixels.

a) If the black pixels are located opposite one another (B=G=1, or D=E=1), then set X to 1.

b) If the black pixels are adjacent to each other, i.e., if B=D=1, for example, the X should be set to 1 provided the number of black pixels in the original image within the block corresponding to B (or D) does not exceed 2.

c) Else, set X to 0.

3) Between B, D, E and G there are exactly three black pixels.

In this case, A should be set to 1 unless it is located in the vicinity of a curved line (say in the form of the character "c") so that improved image quality will be obtained by assigning X=0.

The decision regarding the curvature of the line in the vicinity of X can be reached with consideration being given to the 4×3 array $T_1$ defined as follows (Array 5):

| | | |
|---|---|---|
| A | B | C |
| F | G | H |
| A | D | F |
| C | E | H |

It is customary to say that the curvature is high (i.e. X=0) if in each line of $T_1$ there is at least one black pixel.

4. Lossless Compression and Decompression of the Subsampled Image

The reduced original file $O_r$ will be compressed and stored utilizing any of the conventional techniques for lossless compression of binary files, like MMR or Arithmetic Coder. Naturally, since the file $O_r$ contains only a quarter of the number of pixels as compared to the original file O, it can be coded more efficiently. It has been found experimentally that the subsampled file $O_r$ can be represented by a code two times shorter than that necessary for encoding the original file O.

5. Reconstruction of the Original Image and Postfiltering

The reconstruction of the original file will be performed by reversing the stages explained above. First, by lossless decompression, subsampled file $O_r$ will be retrieved. Then an expanded version $\tilde{O}$ will be obtained such that each pixel of $O_r$ will be replaced by the 2×2 block of pixels having equal value.

Since the subsampling procedure of the invention is designed in a way to preserve the connectivity of the original file, the reconstructed file $\tilde{O}$ will for practical purposes be as legible as the original O. However, since the subsampling causes a increase in effective pixel size, certain lines might have a somewhat "rugged appearance".

Consider, for example, the following short section of the subsampled image $O_r$ (Array 6):

```
. 1
1 .
```

Such a configuration might have resulted from a diagonal line in the original image O, as depicted below (Array 7):

```
. . . . . . 1 1
. . . . . 1 1 1
. . . . 1 1 1 .
. . . 1 1 1 . .
. . 1 1 1 . . .
. 1 1 1 . . . .
1 1 1 . . . . .
1 1 . . . . . .
```

After subsampling and subsequent expansion of the image above, the array shown below will result (Array 8):

```
. . . . . . 1 1
. . . . . . 1 1
. . . . 1 1 . .
. . . . 1 1 . .
. . 1 1 . . . .
. . 1 1 . . . .
1 1 . . . . . .
1 1 . . . . . .
```

Clearly, the original line is smooth while the reconstructed line is flawed by a noticeable "staircase effect" . One obvious approach to solve this problem would be to expand segments of the type (Array 9):

```
. 1
1 .
```

into a filtered array like the one following (Array 10):

```
. . 1 1
. 1 1 1
1 1 1 .
1 1 . .
```

While this technique is adequate for the example shown above, it might cause quality deterioration in certain areas of the image, particularly at right-angle intersections of two lines, as shown in the next array (Array 11):

```
. . . . . . . .
. . . . . . . .
. . . . 1 1 1 1
. . . . 1 1 1 1
. . 1 1 . . . .
. . 1 1 . . . .
. . 1 1 . . . .
. . 1 1 . . . .
```

In this case, an indiscriminate transformation of the before-last Array 6 of $O_r$ into Array 10 in $\tilde{O}$ will distort sharp angles. Therefore, the simple solution outlined above will be unacceptable in practical applications. An alternative approach in accordance with the invention uses post-filtering of the expanded image $\tilde{O}$ in order that diagonal lines (like the one of Array 7 ) will look smooth, and at the same time sharp angles will remain unaltered so as to maintain the subjective impression of a crisp image. This approach is computationally simple enough for the majority of the pixels so as to permit its execution on PC-based systems, with more sophisticated test being required only for relatively few "problematic" areas. The filtering logic proposed in this connection is the following:

a. Traverse the image $O_r$, making no changes unless a "problematic" area (Array 12) is located:

```
1A    A1
   or
B1    1B
```

wherein A or B, or both equal 0.

b. Consider the array shown below (Array 13). The discussion will be limited to a single array of this type although, in practice, one must consider all of the possible orientations this array can have.

```
A B C D
E F . 1
G H 1 I
```

1) If C=1 and B=F=H=0, then we are dealing with a small curve, and Array 13 should be transformed to the following Array 14:

```
A A . . 1 1 D D
A A . . 1 1 D D
E E . . . 1 1 1
E E . . . 1 1 1
G G . . 1 1 I I
G G . . 1 1 I I
```

2) If C=D=E=F=0, then we are dealing with a diagonal line and the array should be transformed to the following (Array 15):

```
A A . . . . . .
A A . . . . . .
. . . . . . 1 1
. . . J H 1 1 1
G G H H 1 1 I I
G G H H 1 1 I I
```

wherein J=1 if both G and H equal 1.

3) Else, we are dealing with the right angle between the two lines and no further action need to be taken, i.e. one proceeds to the next pixel.

Possible Substitution of the Five Stages of the Method

The description so far dealt with the preferred embodiments of the five stages of the inventive method. However, each stage may be modified in a certain way in order to better match the specific needs of any particular application. Some of these possible modifications will be described hereafter.

1. The prefiltering stage as described herein may be changed to another technique capable of reducing the scanning noise, like the one taught by T. Kimoto and R. G. Casey, "Edge Smoothing Algorithms for Horizontal and Vertical Line Patterns in Binary Images" IBM Research Report RJ 4156 (45944) November 1984, or F. M. Wahl, "A Binary Image Processor for Document Quality Improvement and Data Reduction", IBM Research Report RZ 1438 (52141) December 1985. In certain cases, e.g., where the noise is very low, or where there is little time and one is willing to trade performance quality for enhanced running time, it might be advisable to discard this stage altogether.

2. Regarding the fast evaluation of the degree of compressibility, two alternative approaches have been described above: one pixel-based, the other byte-based. In both approaches, one can, of course, modify the various decision thresholds. Moreover, it is conceivable that in applications where the compressibility can be taken as granted, like compression of handwritten texts, this stage is entirely superfluous.

3. As far as the subsampling stage is concerned, it is important to perform this operation in order to guarantee that connectivity be preserved and that no disjoint features will be merged unintentionally. The discussion above of this step was based on the specific example of a subsampling factor of 2, both in x- and y-directions. While this subsampling factor is believed to be the most preferable, the factor may as well be chosen to be $\neq 2$. In cases where a very high compression ration is desired, the subsampling operation may be performed in an iterative manner, with the effective subsampling factor being 2, 4, 8, etc.

4. To perform lossless compression, a variety of conventional coding schemes are available, such as Huffman, MMR or Arithmetic Codec.

5. An alternative to the postfiltering described above would be the use of the filter described in the Kimoto et al. reference mentioned before in connection with the prefiltering step. Again, in certain cases one might be willing to accept some degree of image quality degradation and, therefore, skip the postfiltering procedure.

The hardware implementation of the various operations involved in the inventive method does not require an inventive step: Those skilled in the art will immediately realize that there are various conventional ways to implement the design logic required. One preferred way is the use of look-up tables (LUT). For example, in the subsampling operation, there are three cases to be considered. The differentiation between them is based on the values of certain four pixels (here denoted by B, D, E and G). It will be easy for a skilled person to construct a LUT with 16 ($2^4$) rows and three columns, which would provide a fast way to determine which case is valid at any given time.

The inventive method is advantageous over the existing lossless compression techniques in the sense that it provides a considerable increase in compression ratio. An improvement by a factor of 2 is by no means exaggerated. Of course, this improvement is achieved at the expense of some deterioration of image quality. However, owing to the associative approach of the method of the invention, i.e., the compression scheme used on each particular image element being adapted to the characteristics thereof, the reconstructed binary texts are subjectively almost indistinguishable from the original from which they were derived.

Figure 4:
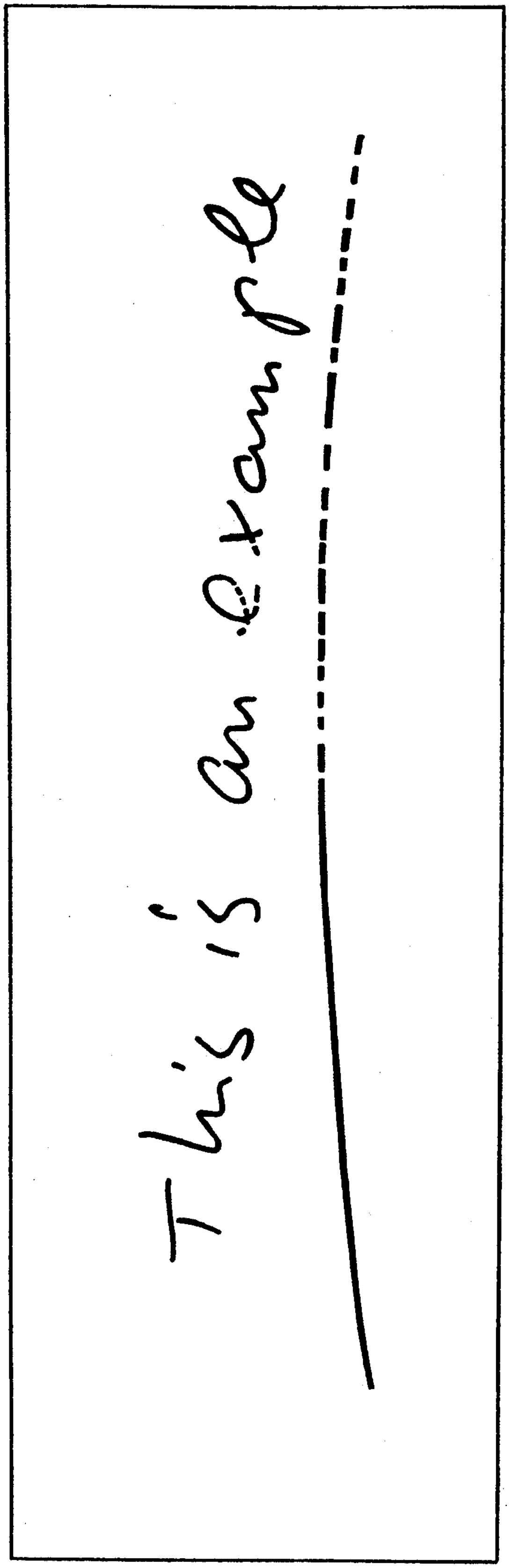
FIG. 4 is a reconstruction of a conventionally compressed handwritten text.
Figure 5:
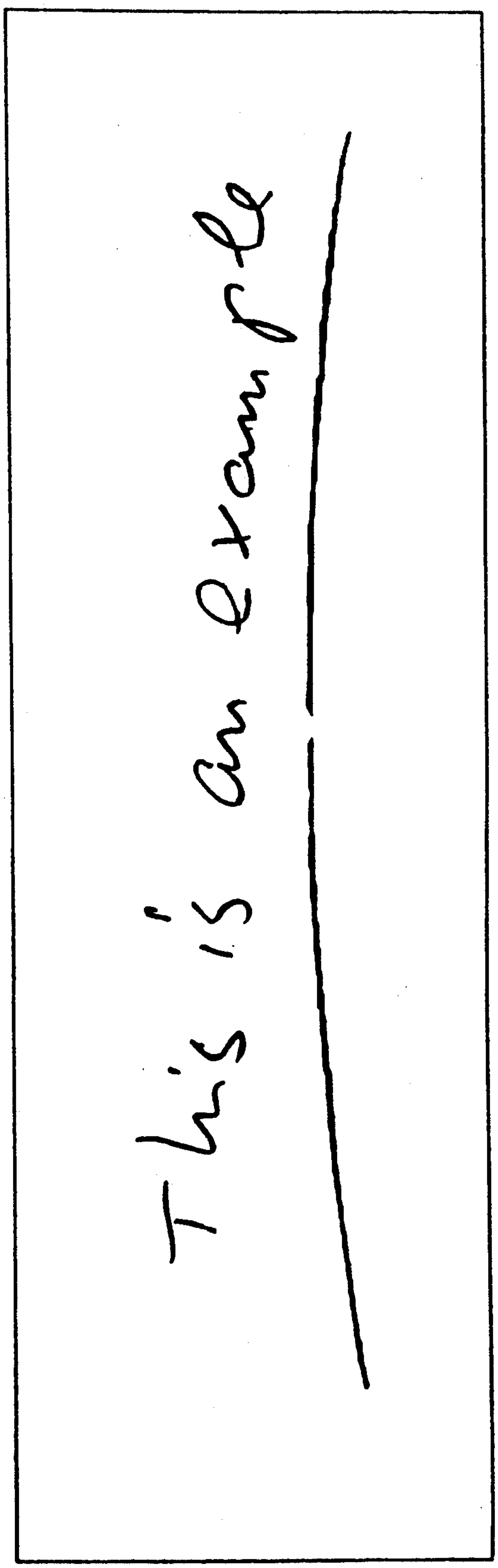
FIG. 5 is a reconstruction of the text of FIG. 4 compressed in accordance with the invention.

As an example, the uncompressed handwritten text to wit: "This is an example" requires 80,000 bytes of storage space. After conventional lossless compression, the same text can be represented by only 2217 bytes. FIG. 4 shows the text so compressed. With the compression scheme of the inventive method, the same text can be compressed to mere 718 bytes. The image reconstructed from those 718 bytes is shown in FIG. 5. Although a more than three-fold higher compression was performed as compared to the conventional lossless compression, the legibility of both, the conventionally compressed image of FIG. 4 and of the reconstructed image of FIG. 5 compressed in accordance with this invention, is virtually the same.

It is pointed out that owing to the specific nature of the inventive method, its implementation is very simple from a hardware point of view. Also most present-day personal computers provide sufficient computing power to accommodate this method.

We claim:

1. Method for high-quality compression of binary text images for storage and possible future processing including transmission over data links, involving the scanning thereof on the record carrier on which they are presented in a pixel-by-pixel raster scan and deriving a string of digital data from the scanner output, characterized by the step of determining the degree of compressibility of the individual features of the original image based on the nature of the scan data derived from a specific vicinity of pixels in the original image, and, depending on the frequency of the information content of the data from said vicinity, assigning one of at least two different compression ratios to the data from each vicinity, and compressing said data in accordance with said one compression ratio.

2. Method in accordance with claim 1, characterized in that those vicinities of pixels having a high information content are assigned a first compression ratio corresponding to lossless compression, and that those vicinities of pixels having a low information content are assigned a second compression ratio corresponding to lossy compression.

3. Method in accordance with claim 1, characterized in that the said vicinity of pixels are defined by partitioning the entire image area into mutually exclusive segments of uniform size, that for each segment the average length (w) of intervals comprising pixels with a "1" and "0" value is determined, that if, for any one segment, the said length exceeds a predetermined value ($w_t$), the next segment is interrogated, otherwise, the contents of a previously cleared pair of registers (m, n) is incremented by 1, and m by w, and that at the end of the segment the feasibility of compression is determined by checking whether n is lower than a predetermined first threshold ($n_t$), or whether the ratio m/n exceeds a predetermined second threshold ($[m/n]_t$), in which cases lossy compression is performed while in all other cases lossless compression is performed.

4. Method in accordance with claim 3, characterized in that the said vicinity are defined as $2\times2$ blocks of pixels, and that for each such block a 1-bit representation is developed by assigning a "0"-value to all blocks having less than two black pixels, a "1"-value to all blocks having more than two black pixels and a "0"-value to all blocks having exactly two black pixels, provided assigning "0"-value for two black pixels does not break a connection between two lines and does not distort line curvature, if it does, a "1"-value is assigned to all blocks having exactly two black pixels.

5. Method in accordance with claim 1, characterized in that said step of determining the degree of compressibility of the individual features of the original image is preceded by a prefiltering step involving the filtering of the scan data prior to compression through forced changing of all isolated "1" pixels as well as all horizontal and vertical sequences of "1" pixels to "0" if the said sequences are shorter than a predetermined length.

6. Method in accordance with claim 5, characterized in that the said predetermined length is set to three pixels.

7. Method in accordance with claim 6, characterized in that the said predetermined length value ($w_t$) is 12, that said first threshold ($n_t$) is 5, and that said second threshold ($[m/n]_t$) is 4.

8. Method for high-quality compression of binary text images for storage and possible future processing including transmission over data links, involving the scanning thereof on the record carrier on which they are presented in a pixel-by-pixel raster scan and deriving a string of digital data from the scanner output, characterized by the step of determining the degree of compressibility of the individual features of the original image based on the nature of the scan data and depending on the frequency of the information content of the data derived from a specific vicinity of pixels in the original document, said vicinity of pixels are defined by partitioning the entire image area into mutually exclusive segments of uniform size, that for each segment the number (m) of nonzero bytes is counted and each such byte is translated into a binary number which equals 1 if the byte under consideration contains a small black or white interval, that is, that byte does not equal either 00000000 or 11111111 and the first bit of the byte equals the last one, and which equals 0 in all other cases, that the number (n) of pairs of consecutive "1's" is counted, and that lossy compression is performed if n is smaller than a predetermined threshold and/or if n is smaller than a predetermined fraction of m, assigning one of at least two different compression ratios to the data from each vicinity, and compressing said data in accordance with said one compression ratio.

9. Method in accordance with claim 8, characterized in that the said predetermined threshold is 3, and that said predetermined fraction equals 5%.

10. Method in accordance with claim 8, characterized in that the said segments each correspond to a line of scan of the original binary text image.

11. Method in accordance with claim 8, characterized in that the said segments each correspond to two consecutive lines of scan of the original binary text image.

12. Method for high-quality compression of binary text images for storage and possible future processing including transmission over data links, involving the scanning thereof on the record carrier on which they are presented in a pixel-by-pixel raster scan and deriving a string of digital data from the scanner output, characterized by the step of determining the degree of compressibility of the individual features of the original image based on the nature of the scan data derived from a specific vicinity of pixels in the original image, and depending on the frequency of the information content of the data from said vicinity, assigning one of at least two different compression ratios to the data from each vicinity, and compressing said data in accordance with said one compression ratio, with a compression ratio being determined by a compression operation involving a reconstruction and postfiltering step applicable to vicinities in accordance with an array of the type $$\begin{array}{cccc} A & B & C & D \\ E & F & . & 1 \\ G & H & 1 & I \end{array}$$

which is executed as follows: - if C=1 and G=F=H=0 (case of a small curve), then said array should be transformed to the following new array:

$$\begin{array}{cccccccc} A & A & . & . & 1 & 1 & D & D \\ A & A & . & . & 1 & 1 & D & D \\ E & E & . & . & . & 1 & 1 & 1 \\ E & E & . & . & . & 1 & 1 & 1 \\ G & G & . & . & 1 & 1 & I & I \\ G & G & . & . & 1 & 1 & I & I \end{array}$$

- and if C=D=E=F=0 (case of a diagonal line), then said array should be transformed to the following new array:

$$\begin{array}{cccccccc} A & A & . & . & . & . & . & . \\ A & A & . & . & . & . & . & . \\ . & . & . & . & . & . & 1 & 1 \\ . & . & . & J & H & 1 & 1 & 1 \\ G & G & H & H & 1 & 1 & I & I \\ G & G & H & H & 1 & 1 & I & I \end{array}$$

in order to preserve curves and sharp angles between lines, and to smooth the reconstructions of diagonal lines.

* * * * *